US008410752B2

(12) United States Patent
Sulem et al.

(10) Patent No.: US 8,410,752 B2
(45) Date of Patent: Apr. 2, 2013

(54) CHARGER DEVICE FOR A PORTABLE ELECTRONIC DEVICE

(75) Inventors: Firmansyah Kuncoko Sulem, Waterloo (CA); Felipe Oliveira Simoes, Kitchener (CA); Michael Xingyi Yu, Waterloo (CA); Dietmar Frank Wennemer, Waterloo (CA)

(73) Assignee: Research In Motion Limited, Waterloo (CA)

( * ) Notice: Subject to any disclaimer, the term of this patent is extended or adjusted under 35 U.S.C. 154(b) by 340 days.

(21) Appl. No.: 12/912,591

(22) Filed: Oct. 26, 2010

(65) Prior Publication Data

US 2012/0098491 A1    Apr. 26, 2012

(51) Int. Cl.
 *H01M 10/46* (2006.01)
(52) U.S. Cl. ........................................ 320/111
(58) Field of Classification Search ............... 320/107, 320/111, 114, 115; 439/166, 170, 171, 173, 439/174, 626, 629
See application file for complete search history.

(56) References Cited

U.S. PATENT DOCUMENTS

| | | | |
|---|---|---|---|
| 3,025,486 A | 3/1962 | Falconer | |
| 4,340,267 A | 7/1982 | Nukaga | |
| 4,445,739 A | 5/1984 | Wooten | |
| 4,810,199 A | 3/1989 | Kar | |
| 5,030,119 A | 7/1991 | Lowe | |
| 5,046,961 A | 9/1991 | Hoffman | |
| 5,108,297 A | 4/1992 | Hoffman et al. | |
| 5,220,152 A * | 6/1993 | Doran | 320/111 |
| 5,518,411 A | 5/1996 | Belleci | |
| 5,599,196 A | 2/1997 | Powell et al. | |
| 5,628,641 A | 5/1997 | Hahn | |
| 5,648,712 A * | 7/1997 | Hahn | 320/111 |
| 6,604,954 B2 | 8/2003 | Chu et al. | |

(Continued)

FOREIGN PATENT DOCUMENTS

| | | |
|---|---|---|
| DE | 35 35 564 A1 | 5/1986 |
| DE | 195 40 304 A1 | 4/1997 |
| DE | 102 35 207 A1 | 4/2003 |
| WO | 2006016119 A2 | 2/2006 |

OTHER PUBLICATIONS http://usb-flash-drive-review.toptenreviews.com.
http://www.geek.com/articles/xyzcomputing/kensington-travel-plug-adapter-with-usb-charger-20060612/.

(Continued)

*Primary Examiner* — Edward Tso
(74) *Attorney, Agent, or Firm* — Lesley M. Morrison; Bordon Lardner Gervais LLP

(57) ABSTRACT

A charger unit includes: a housing, prongs for engaging an electrical outlet, the prongs being coupled to one another by a cross-member and being movable relative to the housing between a retracted position in which the prongs are received in the housing and an extended position in which the prongs protrude from the housing, the prongs being biased toward the extended position, a locking arm comprising a first end, a cut out for receiving the cross-member when the prongs are in the retracted position and a second end for abutting the cross-member when the prongs are in the extended position, the first end of the locking arm being coupled to a carriage and the cutout being provided between the first end and the second end, the locking arm being movable by the carriage into and out of engagement with the cross-member and the locking arm being biased toward the passage and electrical components for electrically communicating with a portable electronic device to enable charging of a power pack of the portable electronic device.

12 Claims, 9 Drawing Sheets

U.S. PATENT DOCUMENTS

| | | |
|---|---|---|
| 6,808,400 B2 | 10/2004 | Tu |
| 6,854,989 B2 | 2/2005 | Milan |
| 7,044,759 B2 | 5/2006 | Hughes |
| 7,131,852 B1 | 11/2006 | Chen |
| 7,425,132 B2 | 9/2008 | Yang et al. |
| 7,445,479 B2 | 11/2008 | Fan et al. |
| 7,494,350 B1 | 2/2009 | Lee |
| 7,597,577 B1 * | 10/2009 | Huang et al. ......... 439/354 |
| 8,272,899 B2 * | 9/2012 | Youssefi-Shams et al. ... 439/638 |
| 2002/0090848 A1 * | 7/2002 | Yu .................. 439/131 |

OTHER PUBLICATIONS http://www.retractacable.com/product_info.php?products_id=208.

Extended European Search Report dated Mar. 31, 2011, issued from the corresponding European patent application No. 10188878.2.

* cited by examiner

CHARGER DEVICE FOR A PORTABLE ELECTRONIC DEVICE

TECHNICAL FIELD

The present embodiments relate to electrical devices having an electrical plug with prongs to interface with an electrical outlet or receptacle, such as charger devices having stowable prongs.

BACKGROUND

Many different types of portable electronic devices are currently available including: personal data assistants (PDAs), smart phones, handheld computers, two-way pagers, music players and cellular telephones, for example. These portable electronic devices are typically powered by rechargeable power packs, which may include rechargeable batteries, such as rechargeable lithium-ion or nickel cadmium batteries, for example. Rechargeable power packs may be re-charged from a low charge state using a charger that plugs into an electrical wall outlet and the portable electronic device.

Some electrical devices having an electrical outlet with prongs that interface with an electrical receptacle, and that have stowable prongs, that is, prongs that are deployed during use and that are stowed when not in use. An illustrative device that may benefit from stowable prongs is a charger device that provides power to or recharges a power pack of a portable electronic device as described above. In general, charger devices having stowable prongs are smaller than devices having permanently deployed prongs. By reducing the size of the charger device, transportation of the charger device is more convenient for users.

DRAWINGS

The following figures set forth embodiments of the invention in which like reference numerals denote like parts. Embodiments of the invention are illustrated by way of example and not by way of limitation in the accompanying figures.

DETAILED DESCRIPTION

The concepts described herein may be applied to a variety of electrical devices, but for convenience, the concepts will be described with reference to a charger. In addition, the concepts will be described herein with respect to electrical plugs similar to those used in North America, having bladed prongs without a grounding connector. The concepts may be adapted to electrical plugs having grounding connectors. The concepts may further be applicable to plugs used outside of North America. Furthermore, the term "prongs" as used herein encompasses a variety of male electrical connectors, whether they are blades, round pins, half-round pins, rectangular pins or any other conformation.

In an aspect there is provided a charger device for recharging a rechargeable battery of a portable electronic device, the charger device including: a housing; prongs for engaging an electrical outlet, the prongs being coupled to one another by a cross-member and being movable relative to the housing between a retracted position in which the prongs are received in the housing and an extended position in which the prongs protrude from the housing, the prongs being biased toward the extended position; a locking arm comprising a first end, a cut out for receiving the cross-member when the prongs are in the retracted position and a second end for abutting the cross-member when the prongs are in the extended position, the first end of the locking arm being coupled to a carriage and the cutout being provided between the first end and the second end, the locking arm being movable by the carriage into and out of engagement with the cross-member and the locking arm being biased toward the passage; and electrical components for electrically communicating with a portable electronic device to enable charging of a power pack of the portable electronic device.

Figure 1:
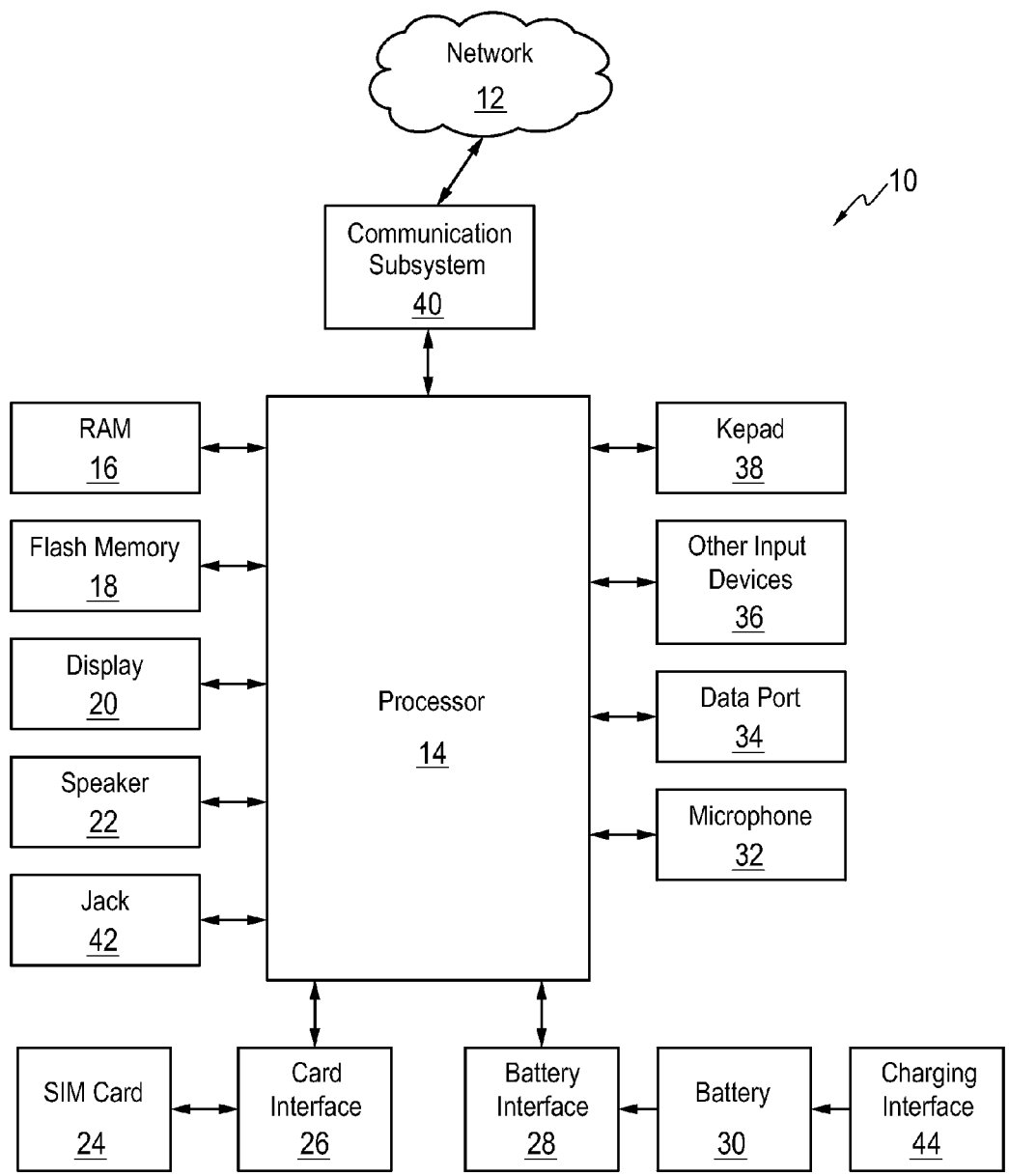
FIG. 1 is a block diagram of an example portable electronic device.

Referring to FIG. 1, components of an example portable electronic device 10 are generally shown. The portable electronic device is just one of many electronic devices that may use a charger having stowable prongs, and in some cases, the portable electronic device itself may include stowable prongs. The portable electronic device 10 includes data communication capabilities and may communicate with other electronic devices directly or through a wireless network. The portable electronic device 10 is based on the computing environment and functionality of a handheld computer, such as a wireless personal digital assistant (PDA), for example. It will be understood, however, that the portable electronic device 10 is not limited to a wireless personal digital assistant. Other portable electronic devices are possible, such as cellular telephones, smart telephones, electronic messaging devices, music players, gaming devices, remote controls and laptop computers, for example.

The portable electronic device 10 includes a number of components including a processor 14, which controls the overall operation of the device 10. A communication subsystem 40 controls data and voice communication functions, such as email, PIN (Personal Identification Number) message functions, SMS (Short Message Service) message functions and cellular telephone functions, for example. The communication subsystem 40 is in communication with a wireless network 12, which may be a data-centric wireless network, a voice-centric wireless network or a dual-mode wireless network.

In FIG. 1, the communication subsystem 40 is a dual-mode wireless network that supports both voice and data communications. The communication subsystem 40 is configured in accordance with the Global System for Mobile Communication (GSM) and General Packet Radio Services (GPRS) standards. The communication subsystem 40 may alternatively be configured in accordance with Enhanced Data GSM Environment (EDGE) or Universal Mobile Telecommunications Service (UMTS) standards. Other wireless networks may also be associated with the portable electronic device 10, including Code Division Multiple Access (CDMA) or CDMA2000 networks. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The wireless network 12 includes base stations (not shown) that provide a wireless link to the portable electronic device 10. Each base station defines a coverage area, or cell, within which communications between the base station and the portable electronic device 10 can be effected. It will be appreciated that the portable electronic device 10 is movable within the cell and can be moved to coverage areas defined by other cells. Data is delivered to the portable electronic device 10 via wireless transmission from the base station. Similarly, data is sent from the portable electronic device 10 via wireless transmission to the base station.

The communication subsystem 40 further includes a short range communications function, which enables the device 10 to communicate directly with other devices and computer systems without the use of the wireless network 12 through infrared or Bluetooth™ technology, for example.

Prior to the portable electronic device 10 being able to send and receive communication signals over the wireless network 12, network registration or activation procedures typically have been completed. In order to enable network communication, a SIM (Subscriber Identity Module) card 24 is inserted into a card interface 26. The SIM card, or Removable User Identity Module card, is used to identify the user of the mobile device, store personal device settings and enable access to network services, such as email and voice mail, for example, and is not bound to a particular portable electronic device 10.

The processor 14 is also connected to a Random Access Memory (RAM) 16 and a flash memory 18. An operating system and device software are typically stored in flash memory 18 and are executable by the processor 14. Some device software components may alternatively be stored in RAM 16. The portable electronic device 10 includes computer executable programmed instructions for directing the portable electronic device 10 to implement various applications. Some examples of applications that may be stored on and executed by the device 10 include: electronic messaging, games, calendar, address book and music player applications. Software applications that control basic device operation, such as voice and data communication, are typically installed during manufacture of the device 10. For devices that do not include a SIM card 24, user identification information may be programmed into the flash memory 18. The flash memory 18 may alternatively be a persistent storage, a Read-Only Memory (ROM) or other non-volatile storage.

The processor 14 receives input from various input devices including a keypad 38 and other input devices 36. The keypad 38 may be a complete alphanumeric keypad or telephone-type keypad. The other input devices 36 may replace or complement the keypad 38 to facilitate input and may include devices such as: single or multi-function buttons, a touch screen, a mouse, a trackball, a capacitive touch sensor or a roller wheel with dynamic button pressing capability. The portable electronic device 10 of FIG. 1 is shown by way of example and it will be appreciated by a person skilled in the art that many different device types, shapes and input device configurations are possible.

The processor 14 outputs to various output devices including an LCD display screen 20. A microphone 32 and speaker 22 are connected to the processor 14 for cellular telephone functions. A data port 34 is connected to the processor 14 for enabling data communication between the portable electronic device 10 and another computing device.

Figure 2:
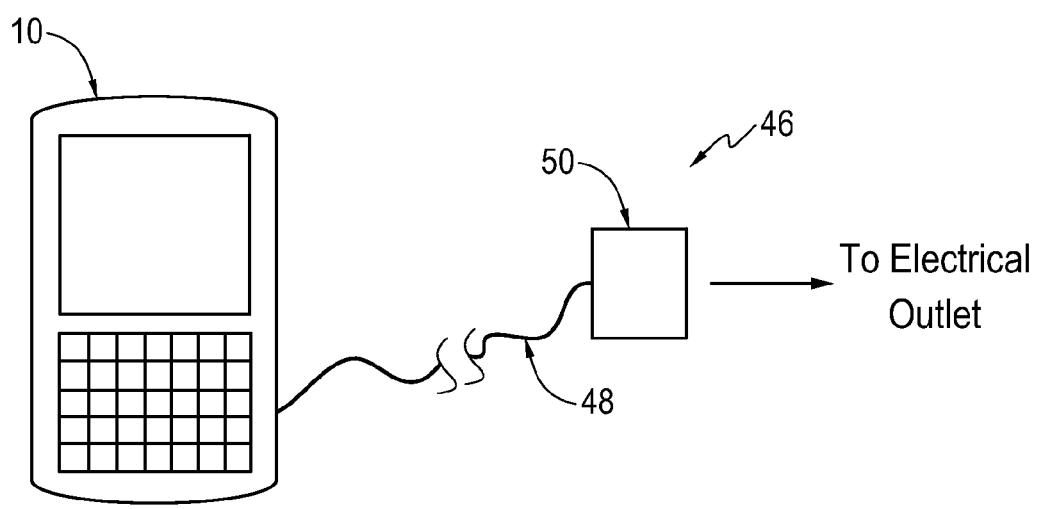
FIG. 2 is a schematic view of a charger device coupled to the portable electronic device of FIG. 1.

The power pack for portable electronic device 10 may be any kind of power pack, typically having one or more rechargeable elements. For simplicity, the power pack will be illustrated as one or more rechargeable batteries 30. Battery interface 28 enables electric communication between one or more rechargeable batteries 30 and the processor 14, that is, the battery interface 28 enables electric power to be delivered from one or more rechargeable batteries 30 to the processor (and perhaps other electrical components as well). A charging interface 44 provides a connection between the rechargeable battery 30 and a charger device 46, which is shown in FIG. 2, when the battery 30 is being recharged. The data port 34 may be incorporated into the charging interface 44 to provide data lines for data transfer and a supply line for charging a battery 30 of the portable device 10.

The portable electronic device 10 is operable in a data communication mode and a voice communication mode. In the data communication mode, a received data signal representing information such as a text message, an email message, a media file to be transferred, or web page download is processed by the communication subsystem 40 and input to the processor 14. The processor 14 further processes the signal and renders images for display on the display screen 20. Alternatively, the processed signals may be output to another computing device through the data port 34. In order to transmit information in the data communication mode, the user of the portable electronic device 10 composes information for transmission, such as email messages, for example, using the keypad 38 and other input devices 36 in conjunction with the display screen 20. The composed information is transmitted through the communication subsystem 40 over the wireless network 12 or via short range communications. Operation of the portable electronic device 10 in the voice communication mode is similar to the data communication mode, however, the received signals are output to the speaker 22, or an auxiliary device such as a headset or headphones, and signals for transmission are generated by the microphone 32. The portable electronic device 10 may also include other voice subsystems, such as a voice message recording subsystem, for example. Jack 42 is provided for receiving an audio accessory such as headphones, a headset, amplified speakers or amplified headphones, for example. Jack 42 may also receive other accessories such as a multi-media accessory including play, pause, stop and rewind buttons or a TV-out accessory that allows for connection of the portable electronic device to a TV, for example.

Only a limited number of device subsystems have been described. It will be appreciated by a person skilled in the art that additional subsystems corresponding to additional device features may also be connected to the processor 14. Further, although many subsystems that use electrical power have been described, the concepts described herein may be applicable to devices that include subsystems that use electrical power, even if such subsystems have not been specifically described. Referring to FIG. 2, a charger device 12 is generally shown coupled to the portable electronic device 10. The charger device 12 includes a charger unit 50 and a cable 48 for connecting the charger unit 50 to the portable electronic device 10. The cable 48 includes a connector (not shown) for coupling to the charging interface 44 of the portable electronic device 10. Connectors of this type are well known in the art and therefore will not be described further here. The charger device 46 may be used with any type of portable electronic device 10 that includes a rechargeable power pack. Examples of portable electronic devices 10 include: personal data assistants (PDAs), smart phones, handheld computers, two-way pagers, music players and cellular telephone, for example. Typically the charger device 46 includes one or more electrical components for electrically communicating with the portable electronic device 10. That is, the charger device 46 may include components that convey and/or condition power from an outlet to enable charging of the power pack of the portable electronic device 10. Such electrical components may include components such as wires or other conductors, transformers, rectifiers and voltage regulators.

Figure 3:
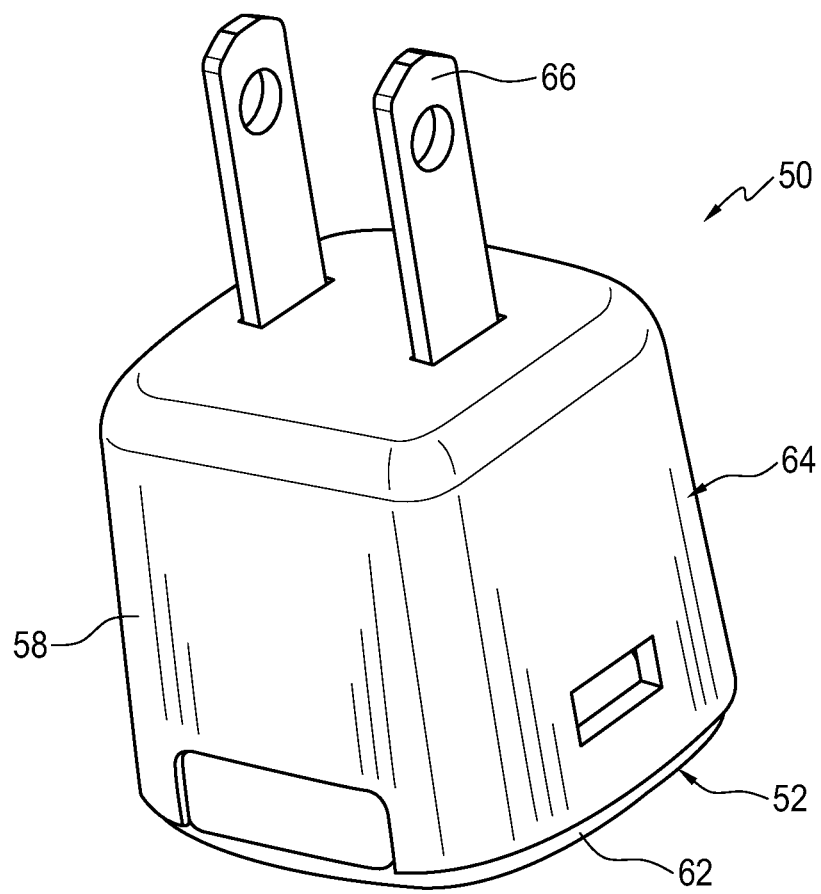
FIG. 3 is an isometric view of a charger unit according to an embodiment.
Figure 4:
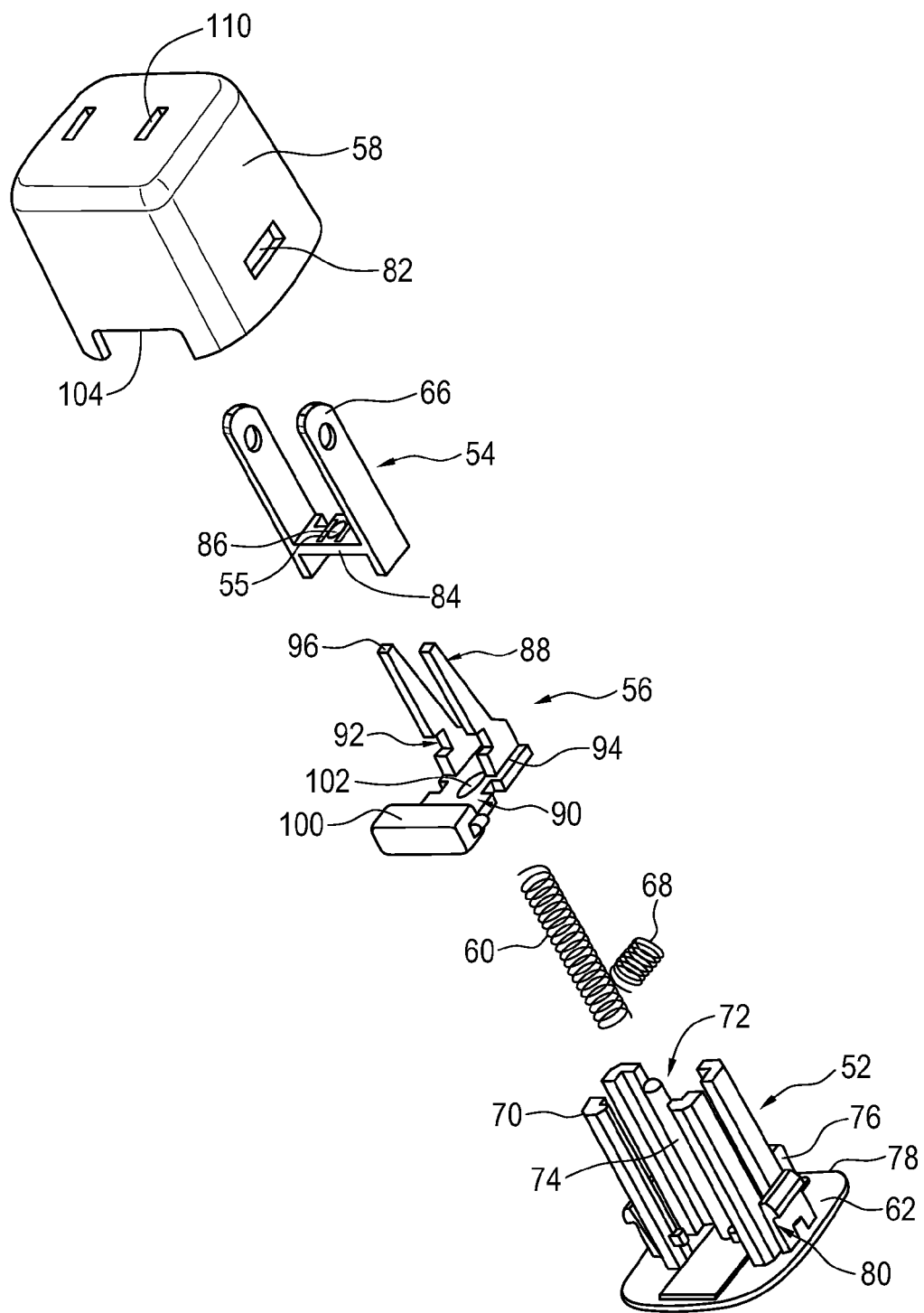
FIG. 4 is an exploded view of FIG. 3 with electrical components omitted.

As shown in FIGS. 3 and 4, the charger unit 50 includes a base 52, a prong unit 54, a locking member 56 and a cover 58 that is coupled to the base 52. When assembled, the cover 58 and an end plate 62 of the base 52 provide a housing 64 that may be handled by a user of the portable electronic device 10 when plugging prongs 66 of the charger unit 14 into an electrical outlet (not shown). A prong unit spring 60 and a locking member spring 68 are further provided within the housing 64.

The base 52 includes four prong unit guides 70 that extend from the end plate 62 of the base 52. The prong unit guides 70 define a passage 72 that is sized for slidably receiving the prong unit 54. A post 74 extends generally from a centre of the end plate 62 and base flange 76 is provided adjacent an edge 78 of the end plate 62.

The base 52 further includes detents 80 that are coupled to the end plate 62. The detents 80 are sized for mating with apertures 82, which are provided on opposite sides of the cover 58. The detents 80 are received in the apertures 82 to hold the cover 58 and the base 52 together when assembled, as shown in FIG. 3. Alternatively, the base 52 and cover 58 may be coupled to one another using an adhesive or an ultrasonic welding process.

Prongs 66 of the prong unit 54 are coupled to one another by a cross-member 84. The cross-member 84 is generally rectangular in cross-section, however, may alternatively be circular, oval, square or any other shape. The cross-member 84 includes an aperture 86 for receiving the post 74. The prong unit 54 is slidable relative to the base 52 along a longitudinal axis of the post 74. Spacers 55 are coupled to the cross-member 84 for abutting an inner surface of the cover 58.

The locking member 56 is generally L-shaped and includes locking arms 88 that are coupled to a carriage 90. Each locking arm 88 includes a cutout 92 that is provided between a first end 94, which is coupled to the carriage 90, and a second end 96 thereof. A flange 98 (shown in FIG. 6) and enlarged end 100 are provided at opposite ends of the carriage 90. A post-receiving slot 102 extends through the carriage 90 for receiving the post 74. The post-receiving slot 102 is sized to receive the post 74 with a clearance that allows for some movement of the carriage 90 relative to the base unit 62. The clearance generally being equal to the distance that the carriage is movable into the housing 64.

In one embodiment, a single locking arm 88 is provided.

Figure 5:
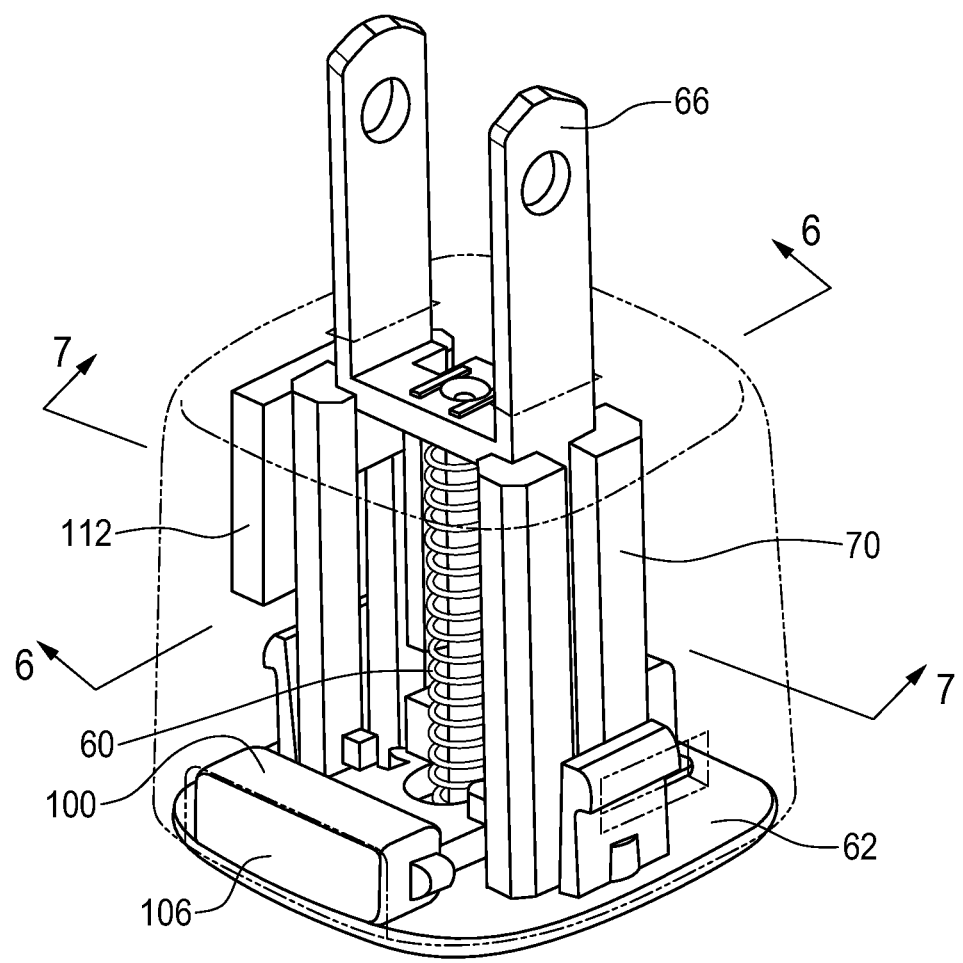
FIG. 5 is an isometric view of the charger unit of FIG. 3 with a cover removed.
Figure 6:
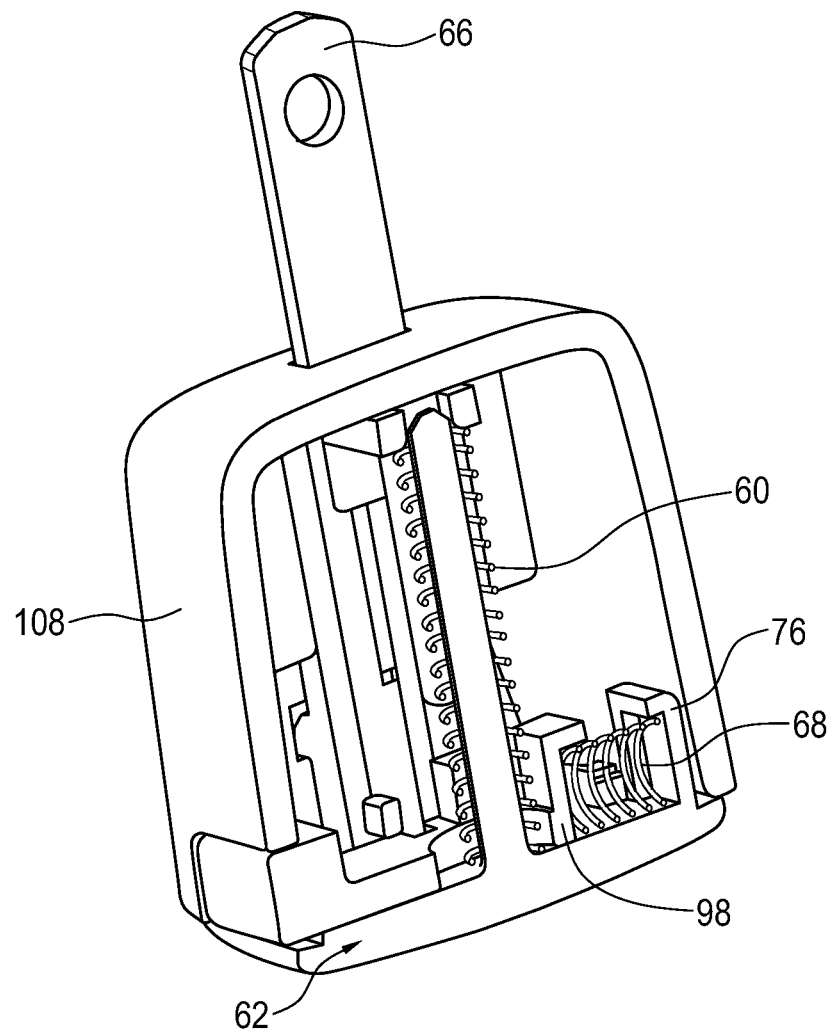
FIG. 6 is an isometric view on 6-6 of FIG. 5 with electrical components omitted.
Figure 7:
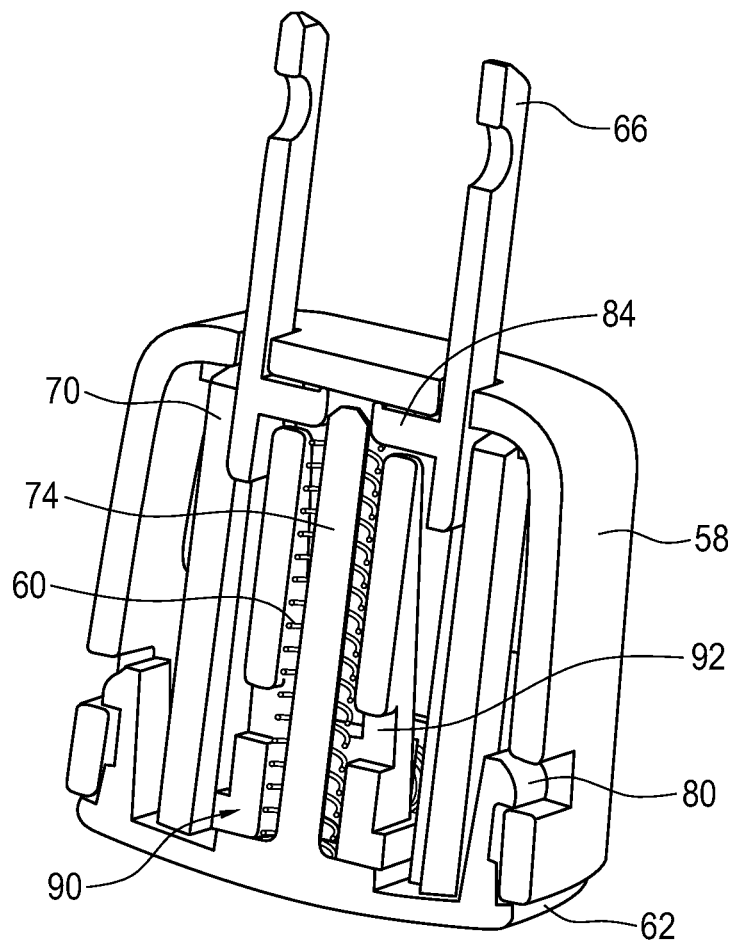
FIG. 7 is an isometric view on 7-7 of FIG. 5 with electrical components omitted.

As shown in FIGS. 4 to 6, when assembled, the locking member 56, the prong unit spring 60 and the prong unit 54 are received over the post 74. The locking member spring 68 is provided between the flange 98 of the locking member 56 and the base flange 76, as shown in FIG. 6. The enlarged end 100 of the locking member 56 is aligned with a cutout 104 of the cover 58 so that it is accessible by the user to function as a button.

Electrical components 112 of the charger unit 50 are shown schematically in FIG. 5. The electrical components 112 includes an electrical contact part (not shown) for contacting the prongs 66 and electrical components provided between the electrical contact part and the cable 48 of the charger device 46 for transferring electrical energy from the electrical outlet to the portable electronic device. The electrical contact part may be a metal spring contact or a brush similar to a brush of an electric motor, for example. The electrical components of charging devices are well known in the art and therefore will not be described further herein. An aperture (not shown) is provided in the housing 64 to allow for the cable 48 to communicate with the electrical components 112. The locking member 56 is movable between a first position and a second position and is biased toward the first position by the locking member spring 68. In the first position, an end surface 106 of the enlarged end 100 is generally flush with an outer surface 108 of the cover 58. In the second position, the end surface 106 of the enlarged end 100 is received within the housing 64.

In one embodiment, the end surface 106 of the enlarged end 100 of the locking member 56 is a different color than the housing 64 so that the user is able to quickly locate the enlarged end 100. In another embodiment, a word, such as "PUSH", for example, is provided on the end surface 106 of the enlarged end 100. Alternatively, a logo, symbol or other characters may be provided on the enlarged end 100. In still another embodiment, the end surface 100 is textured so that the enlarged end 100 may be easily located by a user who is not looking at the charger unit 50. It will be appreciated by a person skilled in the art that these and other features for facilitating user-location of the button may be provided. In addition, the end 98 may be any shape that provides a useable surface that a user may press. The end surface 106 may include protruding features such as waves, dimples or big patterns that allow for quick and easy user location of the button.

The prong unit 54 is movable between an extended position and a retracted position through passage 72 and is biased toward the extended position by the prong unit spring 60. In the extended position, the prongs 66 protrude through slots 110 of the cover 58. In the retracted position, the prongs 66 are received within the housing 64.

Figure 8:
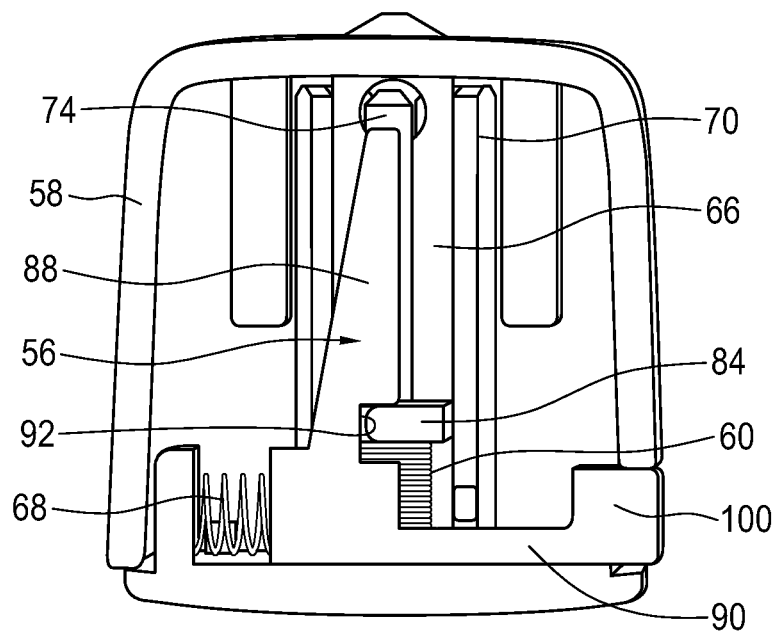
FIG. 8 is a view on 6-6 of FIG. 5 with electrical components omitted showing prongs in a retracted position.
Figure 9:
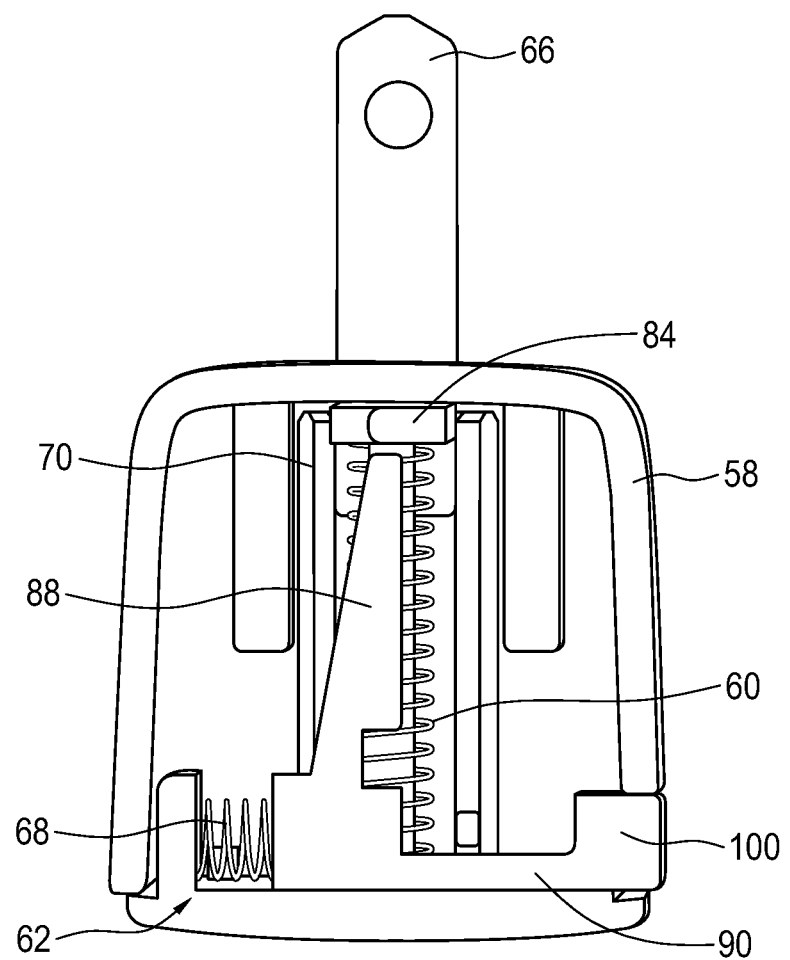
FIG. 9 is a view on 6-6 of FIG. 5 with electrical components omitted showing prongs in an extended position.

In operation, the charger device 46 is stored with the prongs 66 in the retracted position of FIG. 8. To use the charger device 46, the user pushes the enlarged end 100 of the locking member 56 into the second position and then releases the enlarged end 100. This moves the carriage 90, which moves cutouts 92 of the locking arms 88 out of engagement with the cross-member 84 of the prong unit 54. This allows the prong unit spring 60 to uncompress and force the prong unit 54 into the extended position. Once the prong unit 54 has traveled beyond the second end 96 of the locking arms 88, the carriage 90 returns to the first position under the force of the locking member spring 68. In this position, the locking arms 88 abut an underside of the cross-member 84 to restrict movement of the prong unit 54 into the housing 64. The prongs 66 of the charger device 46 may then be plugged into an electrical outlet. The battery 30 of the portable electronic device 10 may then be charged when the cable 48 is connected to the charging interface 44 of the portable electronic device 10.

When charging of the portable electronic device 10 has finished and the user wishes to stow the charger device 46, the user performs the following. The user first pushes the enlarged end 100 of the locking member 56 into the second position, then, when the cutout 92 moves out of engagement with the cross-member 84, the user pushes the prongs 66 at least part way into the housing 64, releases the enlarged end 100 and continues to push the prongs 66 further into the housing 18. When the cutout 92 is aligned with the cross-member 84, the locking member spring 68 forces the carriage 90 into the first position and the cutout 92 receives the cross-member 84. Once the prong unit 54 is locked in the retracted position, the user may release the prongs 66.

The base 52, the cover 58 and the locking member 56 and may be injection molded using a non-conductive material. A suitable plastic, such as polycarbonate or ABS, for example, may be used. The prongs 66 are made of an electrically conductive metal, such as steel, stainless steel or brass, for example.

In another embodiment, the prong unit 54 is stowed at an angle within the housing 64. In this embodiment, the prong unit 54 would follow a track that would move the prongs out of alignment with the slots 110 in the cover 58 so that the prongs 66 would be restricted from extending by the cover. In this embodiment, the prongs 66 would be closer to the walls of the cover 58 to allow more room in the middle of the charger unit 50 for electrical components.

The retractable prongs 66 of the charger device 46 allow the overall size of the device 46 to be reduced. This is particularly useful when traveling because the charger device 46 may be comfortably carried in the user's pocket or may take up only a small portion of a user's luggage.

Another potential advantage of the charger device 46 is that the prongs 66 can be extended and retracted using one hand: a single push of the enlarged end 100 extends the prongs 66 from a retracted position and a push of the enlarged end 100 while pushing the prongs 66 against a surface retracts the prongs 66.

Further, both the extending and retracting actions can be performed in situations where vision is limited by tactilely locating the enlarged end 100.

Another potential advantage is that by providing a retracted position for the charger device 46, the chance of snagging the prongs 66 on clothing or damaging luggage contents is reduced. Further, the chance of accidental stowing of the prongs is reduced by one or more physical features described above. For example, a user's action of inserting the prongs into an electrical outlet (whether due to friction with the outlet or misalignment of the prongs with the respective sockets) will not ordinarily cause the prongs to be stowed.

Specific embodiments have been shown and described herein. However, modifications and variations may occur to those skilled in the art. All such modifications and variations are believed to be within the scope and sphere of the present embodiments.

The invention claimed is:

1. A charger device for recharging a rechargeable battery of a portable electronic device, the charger device comprising:
    a housing;
    prongs for engaging an electrical outlet, the prongs being coupled to one another by a cross-member and being movable relative to the housing between a retracted position in which the prongs are received in the housing and an extended position in which the prongs protrude from the housing, the prongs being biased toward the extended position;
    a locking arm comprising a first end, a cut out for receiving the cross-member when the prongs are in the retracted position and a second end for abutting the cross-member when the prongs are in the extended position, the first end of the locking arm being coupled to a carriage and the cutout being provided between the first end and the second end, the locking arm being movable by the carriage into and out of engagement with the cross-member and the locking arm being biased toward the passage; and
    electrical components for electrically communicating with a portable electronic device to enable charging of a power pack of the portable electronic device.

2. A charger device as claimed in claim 1, wherein the prongs are movable through a passage and the locking arm is movable into and out of the passage, the passage being defined by guides.

3. A charger device as claimed in claim 1, wherein an end of the carriage is accessible from outside of the housing to move the carriage out of the passage to allow for the prongs to move between the retracted position and the extended position.

4. A charger device as claimed in claim 1, wherein the housing comprises a cover that is coupled to a base unit.

5. A charger device as claimed in claim 4, wherein the cover comprises slots for receiving the prongs when the prongs are in the extended position.

6. A charger device as claimed in claim 1, wherein the guides are coupled to a base unit of the housing.

7. A charger device as claimed in claim 6, wherein the cross-member comprises an aperture for receiving a post, the post extending through the passage.

8. A charger device as claimed in claim 7, wherein the carriage comprises a post-receiving slot for receiving the post, the carriage being provided between the base unit and the cross-member and the post-receiving slot being sized to allow for movement of the carriage relative to the base unit.

9. A charger device as claimed in claim 1, wherein the second end of the locking member abuts an underside of the cross-member when the prongs are in the extended position.

10. A charger device as claimed in claim 1, wherein an end surface of the button comprises a feature for facilitating user-location thereof, the feature comprising one or more of: a color, a texture, a word, a logo, a symbol and characters.

11. A charger device as claimed in claim 8, wherein the word is the word "push".

12. A charger device as claimed in claim 1, comprising a pair of locking arms.

* * * * *

UNITED STATES PATENT AND TRADEMARK OFFICE
CERTIFICATE OF CORRECTION

PATENT NO. : 8,410,752 B2
APPLICATION NO. : 12/912591
DATED : April 2, 2013
INVENTOR(S) : Firmansyah Kuncoko Sulem et al.

Page 1 of 1

It is certified that error appears in the above-identified patent and that said Letters Patent is hereby corrected as shown below:

In the Claims

Column 8, line 12, claim 1, delete "passage" and insert therefor -- prongs --.

Signed and Sealed this
Seventeenth Day of September, 2013

Teresa Stanek Rea
*Deputy Director of the United States Patent and Trademark Office*